United States Patent
Wang et al.

(10) Patent No.: US 11,105,894 B2
(45) Date of Patent: Aug. 31, 2021

(54) WEAK TARGET DETECTION METHOD, MICROWAVE RADAR SENSOR, AND UNMANNED AERIAL VEHICLE

(71) Applicant: SZ DJI TECHNOLOGY CO., LTD., Shenzhen (CN)

(72) Inventors: Junxi Wang, Shenzhen (CN); Chunming Wang, Shenzhen (CN); Xumin Wu, Shenzhen (CN); Renli Shi, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/891,712

(22) Filed: Jun. 3, 2020

(65) Prior Publication Data

US 2020/0292664 A1 Sep. 17, 2020

Related U.S. Application Data

(63) Continuation of application No. PCT/CN2017/116836, filed on Dec. 18, 2017.

(51) Int. Cl.
*G01S 7/35* (2006.01)
*G01S 13/935* (2020.01)
*G01S 7/03* (2006.01)
*G01S 13/34* (2006.01)

(52) U.S. Cl.
CPC .............. *G01S 7/352* (2013.01); *G01S 7/03* (2013.01); *G01S 13/343* (2013.01); *G01S 13/935* (2020.01)

(58) Field of Classification Search
CPC .......... G01S 7/352; G01S 13/935; G01S 7/03; G01S 13/343
USPC ........................................................ 342/128
See application file for complete search history.

(56) References Cited

U.S. PATENT DOCUMENTS

| 3,731,304 A | * | 5/1973 | Caspers | ................. | G01S 13/66 |
| | | | | | 342/90 |
| 4,023,171 A | * | 5/1977 | Stavis | .................. | G01S 13/605 |
| | | | | | 342/105 |
| 4,649,388 A | * | 3/1987 | Atlas | .................... | G01S 13/951 |
| | | | | | 342/26 D |

(Continued)

FOREIGN PATENT DOCUMENTS

| CN | 101354439 A | 1/2009 |
| CN | 102680966 A | 9/2012 |

(Continued)

OTHER PUBLICATIONS

The World Intellectual Property Organization (WIPO) International Search Report for PCT/CN2017/116836 dated Sep. 19, 2018 5 pages.

*Primary Examiner* — Bernarr E Gregory
*Assistant Examiner* — Nuzhat Pervin
(74) *Attorney, Agent, or Firm* — Anova Law Group, PLLC (57) ABSTRACT

A weak target detection method includes transmitting a plurality of frequency modulated continuous wave signals during rotation of a microwave radar sensor, receiving a plurality of echo signals reflected by a weak target, accumulating the plurality of echo signals in a beam width of the microwave radar sensor to obtain an accumulated echo signal, and determining position information of the weak target according to the accumulated echo signal.

20 Claims, 6 Drawing Sheets

(56) References Cited

U.S. PATENT DOCUMENTS

| | | | | |
|---|---|---|---|---|
| 5,115,243 | A * | 5/1992 | Perry | G01S 7/282 |
| | | | | 342/137 |
| 5,497,157 | A * | 3/1996 | Gruener | G01S 13/343 |
| | | | | 342/29 |
| 5,673,050 | A * | 9/1997 | Moussally | G01S 13/0209 |
| | | | | 342/22 |
| 6,591,171 | B1 * | 7/2003 | Ammar | G01S 13/4418 |
| | | | | 701/16 |
| 9,075,142 | B2 * | 7/2015 | Takemoto | G01S 13/589 |
| 10,263,329 | B1 * | 4/2019 | Powers | H01Q 3/26 |
| 10,404,261 | B1 * | 9/2019 | Josefsberg | H03L 7/091 |
| 10,598,764 | B2 * | 3/2020 | Josefsberg | H03L 7/091 |
| 2002/0060639 | A1 * | 5/2002 | Harman | G01S 13/62 |
| | | | | 342/28 |
| 2008/0091380 | A1 * | 4/2008 | Nagasaku | H01Q 15/08 |
| | | | | 702/142 |
| 2010/0214152 | A1 * | 8/2010 | Huang | G01S 7/414 |
| | | | | 342/29 |
| 2013/0344445 | A1 * | 12/2013 | Clube | G03F 7/70408 |
| | | | | 430/322 |
| 2015/0212653 | A1 * | 7/2015 | Cable | G06F 3/0426 |
| | | | | 345/175 |
| 2015/0226848 | A1 * | 8/2015 | Park | G01S 7/354 |
| | | | | 342/70 |
| 2016/0041257 | A1 * | 2/2016 | Holbourn | G01S 7/2925 |
| | | | | 342/379 |
| 2016/0178729 | A1 * | 6/2016 | Dolgin | G01S 13/48 |
| | | | | 342/157 |
| 2018/0143314 | A1 * | 5/2018 | Pelletier | H01Q 3/04 |
| 2018/0256507 | A1 * | 9/2018 | Helliwell | A61P 29/00 |
| 2018/0356507 | A1 * | 12/2018 | Ichinose | G01S 13/933 |
| 2019/0056488 | A1 * | 2/2019 | Vacanti | G01S 7/003 |
| 2019/0064338 | A1 * | 2/2019 | Holt | G01S 13/426 |

FOREIGN PATENT DOCUMENTS

| | | | | |
|---|---|---|---|---|
| CN | 102830394 | A | 12/2012 | |
| CN | 106199555 | A | 12/2016 | |
| EP | 1712931 | A1 | 10/2006 | |
| WO | WO-2008006654 | A1 * | 1/2008 | G01S 7/023 |
| WO | WO-2008147574 | A2 * | 12/2008 | G01S 13/933 |

\* cited by examiner

FIG. 6

WEAK TARGET DETECTION METHOD, MICROWAVE RADAR SENSOR, AND UNMANNED AERIAL VEHICLE

CROSS-REFERENCE TO RELATED APPLICATION

This application is a continuation of International Application No. PCT/CN2017/116836, filed Dec. 18, 2017, the entire content of which is incorporated herein by reference.

TECHNICAL FIELD

The present disclosure relates to the unmanned aerial vehicle (UAV) field and, more particularly, to a weak target detection method, a microwave radar sensor, and a UAV.

BACKGROUND

A microwave radar sensor is configured to transmit an electromagnetic wave to detect information of a target in an effective space, such as a distance, a velocity, an angle, etc. A pulse radar and a continuous wave radar are two kinds of radars used for high-precision radar ranging. The continuous wave radar may be a frequency modulated continuous wave (FMCW) radar. To achieve the high-precision radar ranging, the FMCW radar transmits a high-frequency continuous wave. Frequency of the transmitted wave changes with time according to a triangular wave. By measuring frequency of an intermediate frequency signal obtained by mixing the transmitted and received signals, the FMCW radar estimates a distance between the target and the radar sensor. The FMCW radar estimates a relative velocity according to Doppler frequency. The continuous wave radar works in all-weather and can overcome harsh situations such as rain, dust, fog, etc. The continuous wave radar has advantages of high resolution, low cost, etc.

When mounted at a moving carrier, the FMCW radar sensor perceives and detects a surrounding environment of the moving carrier to detect information such as a relative distance, an azimuth, a velocity, etc. The moving carrier completes functions such as active collision avoidance, obstacle avoidance, altitude maintaining, etc., according to the detected information. For example, the moving carrier is an unmanned aerial vehicle (UAV). The UAV can generate flight control instructions according to the detected information to complete the functions such as active collision avoidance, obstacle avoidance, altitude maintaining, etc.

However, when a UAV is in flight, especially an agricultural UAV is in operation, operation fields often have thin power lines, high-voltage power lines, guy lines, etc. The thin power lines, the high-voltage power lines, the guy lines, etc., are weak targets. The above FMCW radar sensor is not able to effectively detect the weak targets from a far distance. When the detection distance is too short, the UAV does not have sufficient response time. Therefore, the FMCW radar sensor cannot provide a favorable guarantee for safe flight of the UAV.

SUMMARY

Embodiments of the present disclosure provide a weak target detection method including transmitting a plurality of frequency modulated continuous wave (FMCW) signals during rotation of a microwave radar sensor, receiving a plurality of echo signals reflected by a weak target, accumulating the plurality of echo signals in a beam width of the microwave radar sensor to obtain an accumulated echo signal, and determining position information of the weak target according to the accumulated echo signal.

Embodiments of the present disclosure provide a microwave radar sensor including a rotating platform, a radar antenna, and a processor. The rotating platform includes a mounting bracket and an electric motor configured to drive the mounting bracket to rotate. The radar antenna is mounted at the mounting bracket and configured to rotate with the mounting bracket. The processor is communicatively connected to the radar antenna and configured to control the radar antenna to transmit a plurality of frequency modulated continuous wave (FMCW) signals during rotation of the mounting bracket, receive echo signals from the processor radar antenna, accumulate the plurality of echo signals in a beam width of the microwave radar sensor to obtain an accumulated echo signal, and determine position information of the weak target according to the accumulated echo signal.

DETAILED DESCRIPTION OF THE EMBODIMENTS

To make purposes, technical solutions, and advantages of the present disclosure clearer, the technical solutions in embodiments of the present disclosure are described in conjunction with accompanying drawings in embodiments of the present disclosure. The described embodiments are only some embodiments not all the embodiments of the present disclosure. Based on the embodiments of the disclosure, all other embodiments obtained by those of ordinary skill in the art without any creative work are within the scope of the present disclosure.

The term "and/or" referred to in the present specification describes an association relationship between associated objects and indicates three kinds of relationships. For example, A and/or B can represent three situations that A exists alone, both A and B exist, and B exists alone. The symbol "/" generally indicates that the associated objects have an "or" relationship.

Figure 1:
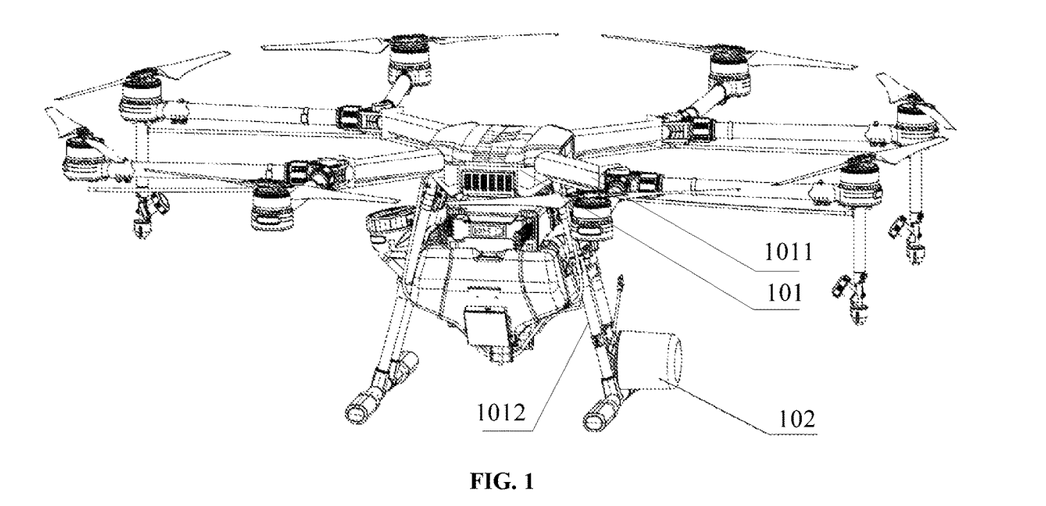
FIG. 1 illustrates a schematic diagram of an application scenario of a weak target detection method according to some embodiments of the present disclosure.

FIG. 1 illustrates a schematic diagram of an application scenario of a weak target detection method according to some embodiments of the present disclosure. As shown in FIG. 1, the weak target detection method of the present disclosure can be applied to an unmanned aerial vehicle (UAV) 10. The UAV includes a frame 101 and a microwave radar sensor 102. The microwave radar sensor 102 is mounted at the frame 101. The microwave radar sensor 102 can rotate at the frame 101. That is, the microwave radar sensor 102 is a rotatable microwave radar sensor. The microwave radar sensor 102 can improve a signal-to-noise ratio of an echo signal by implementing the weak target detection method of the present disclosure. Thus, the method can improve the ability of the microwave radar sensor 102 to detect weak targets, such as thin power lines, high-voltage power lines, guy lines, etc., and enhance safety of UAV operations.

A plurality of specific implementations may be used to enable the microwave radar sensor 102 to rotate at the frame 101, such as using a rotating platform, which is not limited by the embodiments of the present disclosure.

The weak target detection method of the present disclosure not only may be applied to civilian UAVs, but also may be applied in the field of automotive safety control. For example, the weak target detection method may be applied to automotive active ranging sensors. The weak target detection method may further be applied to other fields that need to detect information of a target, such as a distance, a velocity, an angle, etc., which are not listed here.

Figure 2A:
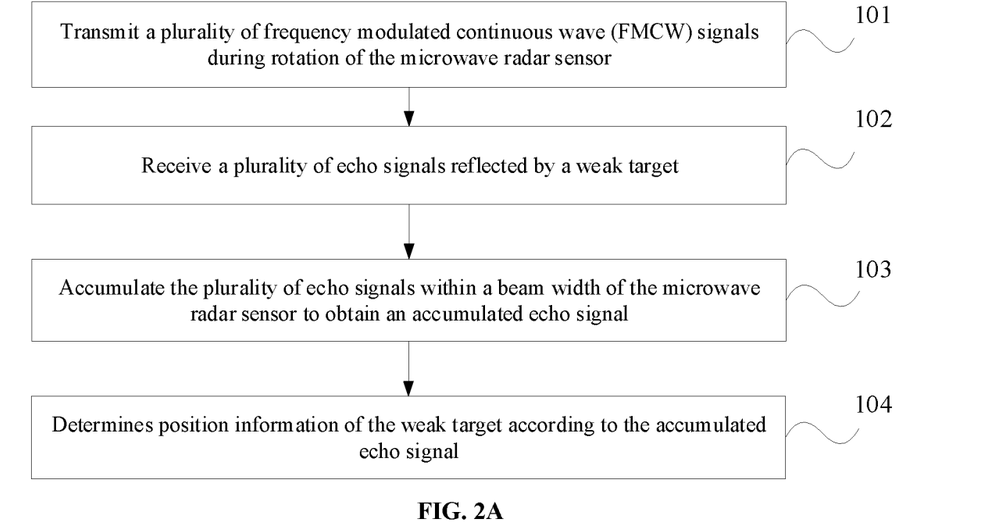
FIG. 2A illustrates a flowchart of a weak target detection method according to some embodiments of the present disclosure.
Figure 2B:
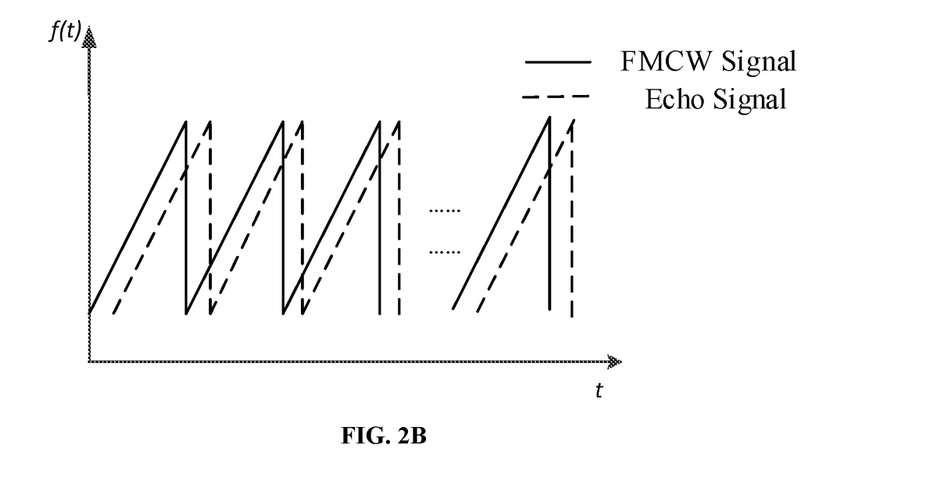
FIG. 2B illustrates a schematic diagram showing a plurality of frequency modulated continuous wave (FMCW) signals and a plurality of echo signals.
Figure 2C:
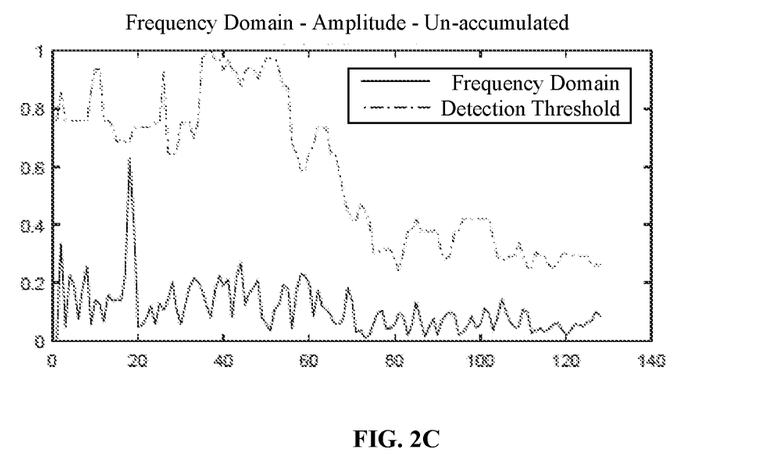
FIG. 2C illustrates a schematic diagram showing un-accumulated echo signals.
Figure 2D:
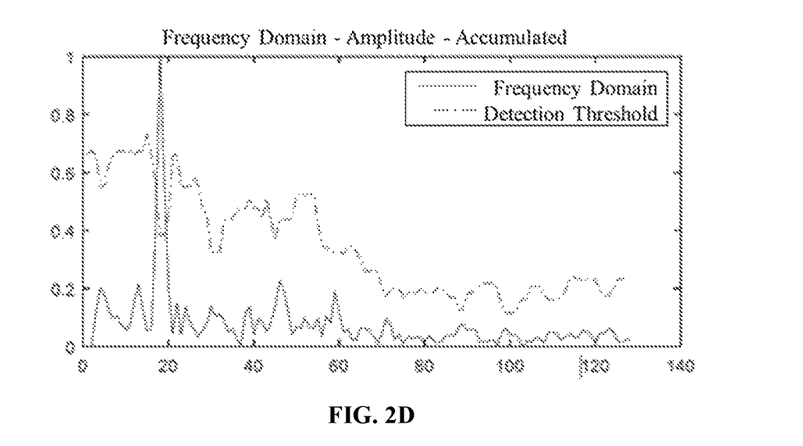
FIG. 2D illustrates a schematic diagram showing accumulated echo signals according to some embodiments of the present disclosure.

FIG. 2A illustrates a flowchart of a weak target detection method according to some embodiments of the present disclosure. FIG. 2B illustrates a schematic diagram showing a plurality of frequency modulated continuous wave (FMCW) signals and a plurality of echo signals. FIG. 2C illustrates a schematic diagram showing unaccumulated echo signals. FIG. 2D illustrates a schematic diagram showing accumulated echo signals according to some embodiments of the present disclosure. The method of the embodiments is applied to the above rotatable microwave radar sensor. As shown in FIG. 2A, the method includes following processes.

At 101, the microwave radar sensor transmits a plurality of frequency modulated continuous wave (FMCW) signals during rotation of the microwave radar sensor.

In some embodiments, the microwave radar sensor rotates at a preset angular velocity. The microwave radar sensor transmits the plurality of FMCW signals during the rotation of the microwave radar sensor. The FMCW signals may be sawtooth wave signals or triangular wave signals. Hereinafter, sawtooth wave signals are taken as an example for description. As shown in FIG. 2B, the horizontal axis is the time axis, and the vertical axis is the frequency axis. Each solid line sawtooth in FIG. 2B represents an FMCW signal. Frequency of the FMCW signal is continuous. As shown in FIG. 2B, the microwave radar sensor transmits the plurality of FMCW signals.

A number of the FMCW signals may be set flexibly as needed, for example, 2, 3, 4, etc.

At 102, the microwave radar sensor receives a plurality of echo signals reflected by a weak target.

The plurality of FMCW signals transmitted at 101 reach the weak target and are reflected by the weak target. The microwave radar sensor receives the plurality of echo signals reflected by the weak target. As shown in FIG. 2B, each dashed line sawtooth represents an echo signal. The echo signal is a reflected signal of the FMCW signal. As shown in FIG. 2B, the microwave radar sensor receives the plurality of echo signals.

The echo signals may be the sawtooth echo signals or triangular echo signals, which are related to the transmitted FMCW signals.

At 103, the plurality of echo signals within a beam width of the microwave radar sensor are accumulated to obtain an accumulated echo signal.

In some embodiments, the plurality of echo signals shown in FIG. 2B are accumulated to obtain the accumulated echo signal.

At 104, position information of the weak target is determined according to the accumulated echo signal.

In some embodiments, the position information of the weak target is determined according to the FMCW signal and the accumulated echo signal. For example, an intermediate frequency signal is obtained by mixing the FMCW signal and the accumulated echo signal, a distance from the weak target to the microwave radar sensor is obtained according to the intermediate frequency signal, and information of the relative velocity, etc., is determined according to Doppler frequency.

FIG. 2C and FIG. 2D are taken as examples for explaining determination of the position information according to the accumulated echo signal. In FIG. 2C, the un-accumulated echo signal is a portion with a largest amplitude of the solid line, remaining portions of the solid line are noise signals. As shown in FIG. 2C, the signal-to-noise ratio of the un-accumulated echo signal is relatively low. The portion with the largest amplitude of the solid line is lower than a detection threshold, which is regarded as invalid detection, such that the weak target cannot be effectively detected. Different from the un-accumulated echo signal, the accumulated echo signal is obtained according to the method of the present disclosure. The accumulated echo signal is a portion with a largest amplitude of the solid line in FIG. 2D, and remaining portions of the solid line in FIG. 2D are noise signals. As shown in FIG. 2D, the signal-to-noise ratio of the accumulated echo signal is relatively high. The portion with the largest amplitude of the solid line is higher than the detection threshold, such that the method can determine the position information of the weak signal according to the accumulated echo signal and effectively detect the weak target.

In some embodiments, the position information may include one or more combinations of a relative distance, an azimuth, and a velocity, which can be set flexibly according to detection needs.

In some embodiments, a number of the accumulation echo signals is smaller than or equal to a largest accumulation number, i.e., a largest number of echo signals that can be accumulated. The largest accumulation number decreases as the angular velocity of the microwave radar sensor increases.

In some embodiments, the largest accumulation number is determined according to the angular velocity of the microwave radar sensor, a 3 db beam width, and a period of the echo signal.

In some embodiments, the largest accumulation number increases as the 3 db beam width increases.

In some embodiments, the largest accumulation number decreases as the period of the echo signal increases.

In some embodiments, the largest accumulation number equals a ratio of the beam width to the angular velocity of the microwave radar sensor and the period of the echo signal. The largest accumulation number M (a positive integer) may be determined according to formula (1).

$$M = \frac{\theta}{\varepsilon \cdot T} \quad (1)$$

where, $\theta$ denotes the beam width, T denotes the period of the echo signal, and $\varepsilon$ denotes the angular velocity of the microwave radar sensor. $\theta$ may be the 3 db beam width.

In some embodiments, during the rotation of the microwave radar sensor, the microwave radar sensor transmits a plurality of FMCW signals and receives the plurality of echo signals reflected by the weak target. The plurality of echo signals within the beam width of the microwave radar sensor are accumulated to obtain the accumulated echo signal. The position information of the weak target is determined according to the accumulated echo signal. That is, through accumulation of the echo signals, the method enhances the echo wave energy of the weak target and increases the signal-to-noise ratio of the weak target. The method improves the ability of the microwave radar sensor to detect the weak target, such as the thin power lines, the high-voltage power lines, the guy lines, etc.

Technical solutions of the method embodiments shown in FIG. 2A are described in detail using some specific embodiments.

In the embodiments of the present disclosure, the above accumulation can be a coherent accumulation or a non-coherent accumulation, depending on whether phase information of the echo signal is used.

Figure 3:
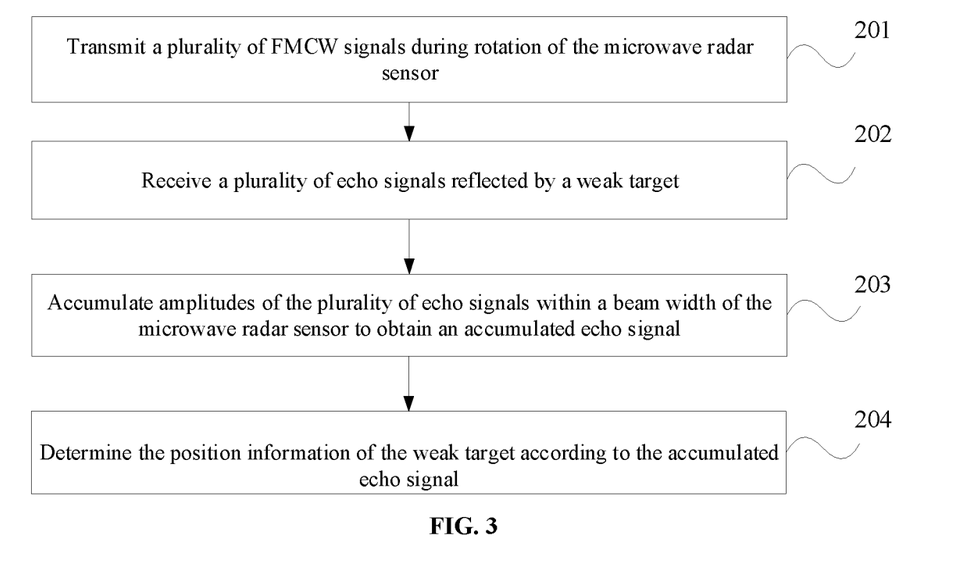
FIG. 3 illustrates a flowchart of another weak target detection method according to some embodiments of the present disclosure.
Figure 4:
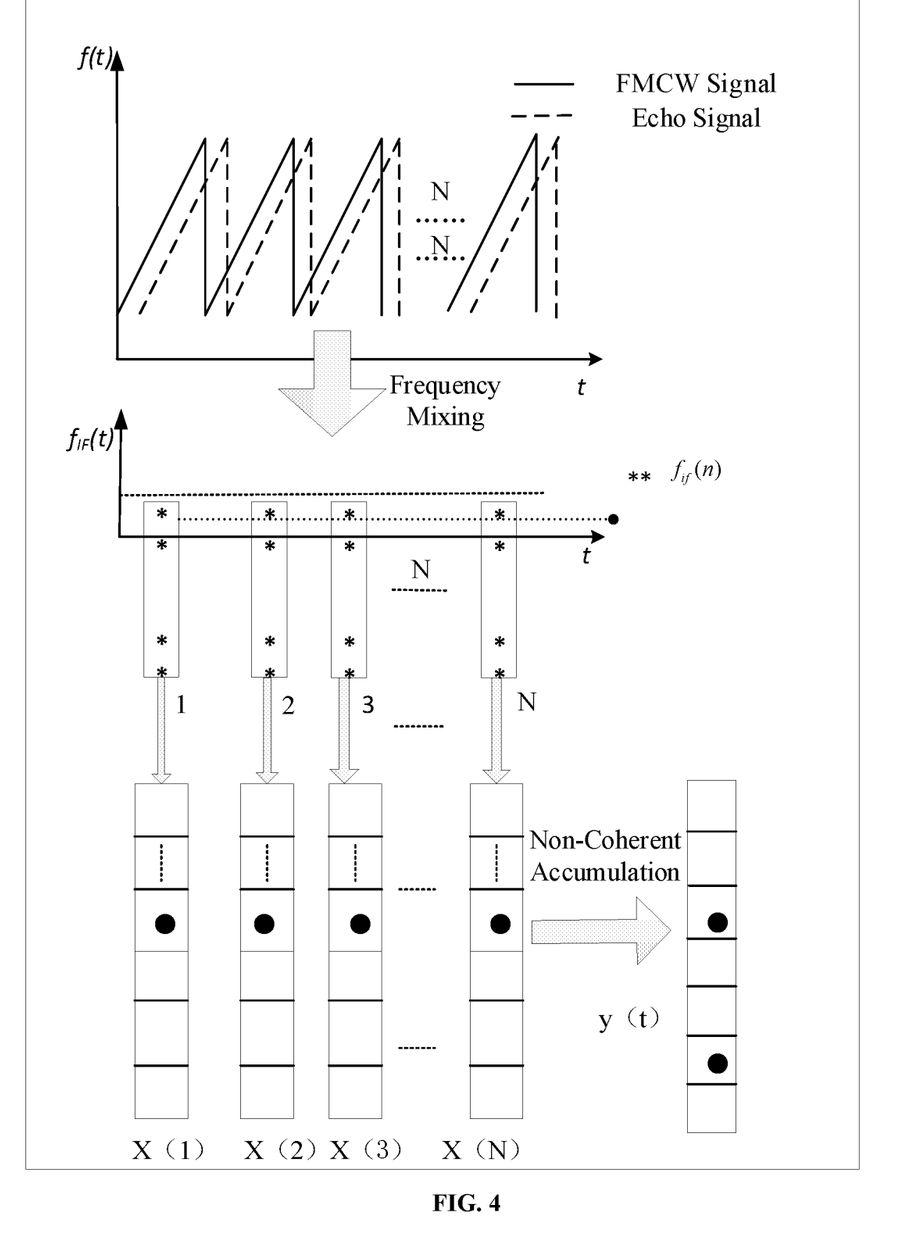
FIG. 4 illustrates a schematic diagram showing accumulation of echo signals according to some embodiments of the present disclosure.

FIG. 3 illustrates a flowchart of a weak target detection method according to some embodiments of the present disclosure. FIG. 4 illustrates a schematic diagram showing accumulating echo signals according to some embodiments of the present disclosure. FIGS. 3 and 4 show the non-coherent accumulation, as described in more detail below. As shown in FIG. 3, at 201, a microwave radar sensor transmits a plurality of FMCW signals during rotation of the microwave radar sensor.

At 202, the microwave radar sensor receives a plurality of echo signals reflected by a weak target.

For specific description of process 201 and process 202, reference may be made to the description of process 101 and process 102 shown in FIG. 2A, which is not repeated here.

At 203, amplitudes of the plurality of echo signals within a beam width of the microwave radar sensor are accumulated to obtain an accumulated echo signal.

In some embodiments, the amplitudes of the plurality of echo signals within the beam width of the microwave radar sensor are accumulated to obtain the accumulated signal. Thus, the method increases the signal-to-noise ratio of the accumulated echo signal.

An implementation is to perform a weighted calculation on the amplitudes of the plurality of echo signals within the beam width of the microwave radar sensor to obtain accumulated amplitude information. The weight coefficient of the weighted calculation can be flexibly set as needed.

In some embodiments, the weighted calculation is a weighted average calculation.

The method accumulates the amplitudes of the plurality of echo signals within the beam width of the microwave radar sensor to obtain the accumulated echo signals. In some embodiments, the accumulation can be performed in the time domain. The accumulation is described below using an example in which the echo signal is a sawtooth echo signal x(t), where $x(t)=A*e^{j(2\pi ft+\varphi)}+w(t)$, and the number of the accumulation echo signals is N, where N is a positive integer. The specific implementation may include obtaining the accumulated echo signal y(t) according to formula (2).

$$y(t) = \{\Sigma_i^N |x_i(t)|\}/N \quad (2)$$

where A denotes the signal amplitude of the sawtooth echo signal, f denotes frequency, $\varphi$ denotes a phase, and w(t) denotes noise signals. N is smaller than or equal to M described above.

In some embodiments, the amplitudes of the plurality of echo signals within the beam width of the microwave radar sensor can be accumulated in the frequency domain to obtain the accumulated echo signal. For example, each echo signal in the beam width of the microwave radar sensor is sampled according to a preset sampling frequency to obtain a sampled signal of each echo signal. A Fourier transform is performed on the sampled signal of each echo signal to obtain a frequency domain signal for each echo signal. The frequency domain signals of the plurality of echo signals are accumulated to obtain the accumulated echo signal.

The preset sampling frequency may be set flexibly as needed.

As shown in FIG. 4, from top to bottom, a horizontal axis of a first coordinate system is a time axis, and a vertical axis is a frequency axis. Each solid line sawtooth of the first coordinate system represents an FMCW signal, and frequency of the FMCW signal is continuous. As shown in FIG. 4, the microwave radar sensor transmits the plurality of FMCW signals, and each dashed line sawtooth represents an echo signal. As shown in FIG. 4, the microwave radar sensor receives the plurality of echo signals. A scenario with N echo signals is taken as an example for description. The N echo signals are sampled with a preset sampling frequency to obtain a sampled signal for each echo signal, which is referred to as $f_{if}(n)$ in FIG. 4. A Fourier transform is performed on the sampled signal of each echo signal to obtain the frequency domain signal for each echo signal. As shown in FIG. 4, the Fourier transform is performed on the sampled signal of the first echo signal to obtain the frequency domain signal X(1) of the first echo signal, the Fourier transform is performed on the sampled signal of the second echo signal to obtain the frequency domain signal X(2) of the second echo signal, and so on so forth. The Fourier transform is performed on the sampled signal of the N-th echo signal to obtain the frequency domain signal X(N) of the N-th echo signal. The amplitudes of the frequency domain signals (X(1), X(2), ..., X(N)) of the N echo signals are accumulated and an inverse Fourier transform is performed to obtain the accumulated echo signal as y(t) shown in FIG. 4.

At 204, the position information of the weak target is determined according to the accumulated echo signal.

For the specific description of process 204, reference may be made to the description of process 104 shown in FIG. 2A, which is not repeated here.

In some embodiments, during the rotation of the microwave radar sensor, the microwave radar sensor transmits the plurality of FMCW signals and receives the plurality of echo signals reflected by the weak target. The plurality of echo signals within the beam width of the microwave radar sensor are accumulated to obtain the accumulated echo signal. The position information of the weak target is determined according to the accumulated echo signal. That is, through accumulation of the echo signals, the method enhances the echo energy of the weak target and increases the signal-to-noise ratio of the weak target. The method improves the ability of the microwave radar sensor to detect the weak target, such as the thin power lines, the high-voltage power lines, the guy lines, etc.

The implementation of the above non-coherent accumulation is simple and convenient.

Figure 5:
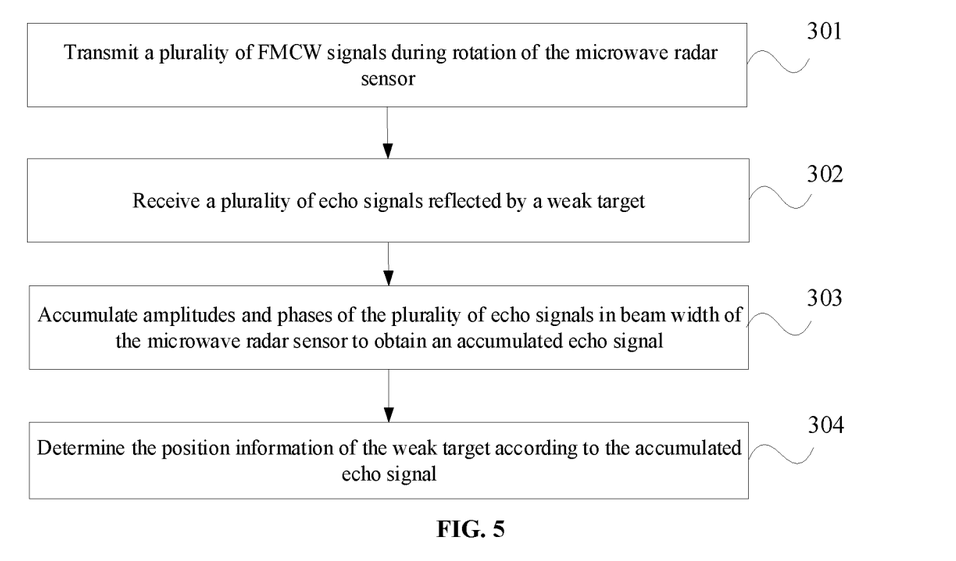
FIG. 5 illustrates a flowchart of another weak target detection method according to some embodiments of the present disclosure.

FIG. 5 illustrates a flowchart of a weak target detection method according to some other embodiments of the present disclosure. In the example shown in FIG. 5, a coherent accumulation is adopted. As shown in FIG. 5, at 301, a microwave radar sensor transmits a plurality of FMCW signals during rotation of the microwave radar sensor.

At 302, the microwave radar sensor receives a plurality of echo signals reflected by a weak target.

For specific description of process 301 and process 302, reference may be made to the description of process 101 and process 102 shown in FIG. 2A, which is not repeated here.

At 303, amplitudes and phases of the plurality of echo signals in a beam width of the microwave radar sensor are accumulated to obtain an accumulated echo signal.

In some embodiments, during the accumulation of the plurality of echo signals, amplitude information and phase information of the echo signals are both used. The method can effectively increase an accumulation gain and improve detection performance of detecting the weak target.

At 304, the position information of the weak target is determined according to the accumulated echo signal.

For the specific description of process 304, reference may be made to the description of process 104 shown in FIG. 2A, which is not repeated here. In the embodiments, during the rotation of the microwave radar sensor, the microwave radar sensor transmits the plurality of FMCW signals and receives the plurality of echo signals reflected by the weak target. The plurality of echo signals within the beam width of the microwave radar sensor are accumulated to obtain the accumulated echo signal. The position information of the weak target is determined according to the accumulated echo signal. That is, through accumulation of the echo signals, the method enhances the echo energy of the weak target and increases the signal-to-noise ratio of the weak target. The method improves the ability of the microwave radar sensor to detect the weak target, such as the thin power lines, the high-voltage power lines, the guy lines, etc.

The above-described coherent accumulation can effectively increase the accumulation gain to improve the detection ability of detecting the weak target.

Figure 6:
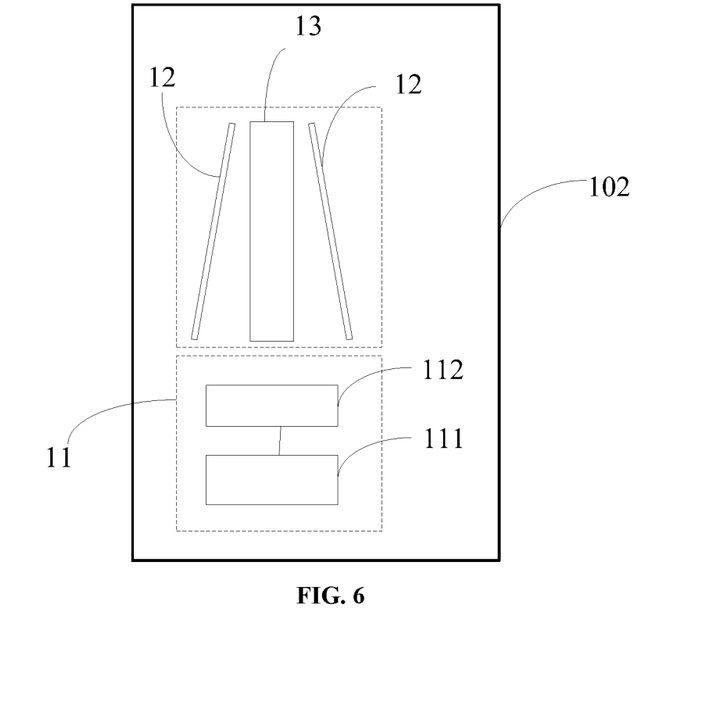
FIG. 6 illustrates a schematic structural diagram of a microwave radar sensor according to some embodiments of the present disclosure.

FIG. 6 illustrates a schematic structural diagram of a microwave radar sensor 102 according to some embodiments of the present disclosure. As shown in FIG. 6, the microwave radar sensor 102 includes a rotating platform 11, a radar antenna 12, and a processor 13. The rotating platform 11 includes a mounting bracket 111, and an electric motor 112 configured to drive the mounting bracket 111 to rotate. The radar antenna 12 is mounted at the mounting bracket 111 and rotates with the mounting bracket 111. The radar antenna 12 is configured to transmit FMCW signals and receive a plurality of echo signals reflected by the weak target. The processor 13 is communicatively connected to the radar antenna 12. The processor 13 controls the radar antenna 12 to transmit the plurality of FMCW signals during the rotation of the mounting bracket 111. The radar antenna 12 transmits the echo signals to the processor 13. The processor 13 accumulates the plurality of echo signals in the beam width of the microwave radar sensor to obtain the accumulated echo signal. The processor 13 determines the position information of the weak target according to the accumulated echo signal.

In some embodiments, the echo signals are sawtooth echo signals or triangular echo signals.

In some embodiments, the number of the accumulation echo signals is smaller than or equal to the largest accumulation number. The largest accumulation number decreases as the angular velocity of the microwave radar sensor increases.

In some embodiments, the largest accumulation number is determined according to the angular velocity of the microwave radar sensor, the 3 db beam width, and the period of the echo signal.

In some embodiments, the largest accumulation increases as the 3 db beam width increases.

In some embodiments, the largest accumulation number decreases as the period of the echo signal increases.

In some embodiments, the largest accumulation number equals the ratio of the beam width to the angular velocity of the microwave radar sensor and the period of the echo signals.

In some embodiments, the processor 13 is configured to accumulate the amplitudes of the plurality of echo signals within the beam width of the microwave radar sensor to obtain the accumulated echo signal.

In some embodiments, the processor 13 is configured to perform the weighted calculation on the amplitude of the plurality of echo signals within the beam width of the microwave radar sensor to obtain accumulated amplitude information.

In some embodiments, the weighted calculation is the weighted average calculation.

In some embodiments, the processor 13 is configured to sample each echo signal within the beam width of the microwave radar sensor with the preset sampling frequency to obtain the sampled signal of each echo signal. The processor 13 is further configured to perform Fourier transform on the sampled signal of each echo signal to obtain the frequency domain signal for each echo signal. The processor 13 is further configured to accumulate the amplitudes of the plurality of echo signals within the beam width of the microwave radar sensor in the frequency domain to obtain the accumulated echo signal.

In some embodiments, the processor 13 is configured to accumulate the amplitudes and phases of the plurality of echo signal within the beam width of the microwave radar sensor to obtain the accumulated echo signal.

In some embodiments, the position information may include any one or combinations of the relative distance, the azimuth, and the velocity.

The microwave radar sensor of the embodiments is configured to execute the technical solutions of the above-described method embodiments. Implementation principle and technical effect are similar, which are not repeated here.

Embodiments of the present disclosure further provide a UAV. For a specific structure of the UAV, reference may be made to the UAV shown in FIG. 1. The UAV includes the frame 101 and the above-described microwave radar sensor 102. The microwave radar sensor 102 is mounted at the frame 101.

In some embodiments, the UAV is an agricultural plant protection UAV.

In some embodiments, the frame 101 includes a body 1011 and a stand 1012 connected to the body 101. The microwave radar sensor 102 is mounted at the stand 1012.

The UAV of the present disclosure can be configured to execute the technical solutions of the above-described method embodiments. The implementation principle and technical effect are similar, which are not repeated here.

The embodiments of the disclosure, the devices and methods disclosed can be implemented in other forms. For example, the device embodiments described above are merely illustrative. For example, the division of the units is only a logical function division, and the actual implementation may be according to another division method. For example, a plurality of units or components can be combined or integrated in another system, or some features can be omitted or not be executed. Further, the displayed or discussed mutual coupling or direct coupling or communicative connection can be through some interfaces, the indirect coupling or communicative connection of the devices or units can be electronically, mechanically, or in other forms.

The units described as separate components may be or may not be physically separated, the components displayed as units may be or may not be physical units, which can be in one place or be distributed to a plurality of network units. Some or all of the units can be chosen to implement the purpose of the embodiment according to the actual needs.

In the embodiment of the disclosure, individual functional units can be integrated in one processing unit, or can be individual units physically separated, or two or more units can be integrated in one unit. The integrated units above can be implemented by hardware or can be implemented by hardware and software functional units.

The integrated units implemented by software functional units can be stored in a computer-readable storage medium. The above software functional units stored in a storage medium includes a plurality of instructions for a computing device (such as a personal computer, a server, or network device, etc.) or a processor to execute some of the operations in the embodiments of the disclosure. The storage medium includes USB drive, mobile hard disk, read-only memory (ROM), random access memory (RAM), disk or optical disk, or another medium that can store program codes.

Those skilled in the art can understand that, for convenient and simple description, the division of individual functional modules are described as an example. In actual applications, the functions above can be assigned to different functional modules for implementation, i.e., the internal structure of the device can be divided into different functional modules to implement all or some of the functions described above. For the specific operation process of the device described above, reference can be to the corresponding process in the method embodiments, which is not be described in detail here.

The embodiments are merely used to describe the technical solution of the disclosure but not used to limit the disclosure. Although the disclosure is described in detail with reference to the individual embodiments, one of ordinary skill in the art should understand that it is still possible to modify the technical solutions in the embodiments, or to replace some or all of the technical features. However, these modifications or substitutions do not cause the essence of the corresponding technical solution to depart from the scope of the technical solutions in the individual embodiments of the disclosure.

What is claimed is:

1. A weak target detection method comprising:
   transmitting a plurality of frequency modulated continuous wave (FMCW) signals during rotation of a microwave radar sensor;
   receiving a plurality of echo signals reflected by a weak target;
   determining a number of the plurality of echo signals in an accumulation, the number of the plurality of echo signals being smaller than or equal to a largest accumulation number, and the largest accumulation number indicating a maximum number of echo signals that are able to be accumulated based on a parameter associated with the microwave radar sensor;
   accumulating and adding the plurality of echo signals, each including a frequency within a beam width of the microwave radar sensor, based on the number of the plurality of echo signals to form an accumulated echo signal, and
   determining position information of the weak target according to the accumulated echo signal and detection thresholds within the beam width of the microwave radar sensor.

2. The method of claim 1, wherein the largest accumulation number decreases as an angular velocity of the microwave radar sensor increases.

3. The method of claim 1, wherein the largest accumulation number is determined according to the angular velocity of the microwave radar sensor, a 3db beam width, and a period of the echo signals.

4. The method of claim 3, wherein the largest accumulation number increases as the 3db beam width increases.

5. The method of claim 3, wherein the largest accumulation number decreases as the period of the echo signals increases.

6. The method of claim 3, wherein the largest accumulation number is equal to a ratio of the beam width to the angular velocity of the microwave radar sensor and the period of the echo signals.

7. The method of claim 1, wherein accumulating and adding the plurality of echo signals to form the accumulated echo signal includes:
   accumulating amplitudes of the plurality of echo signals in the beam width of the microwave radar sensor to obtain the accumulated echo signal.

8. The method of claim 7, wherein accumulating the amplitudes of the plurality of echo signals in the beam width of the microwave radar sensor to obtain the accumulated echo signal includes:
   performing a weighted calculation to the amplitudes of the plurality of echo signals in the beam width of the microwave radar sensor to obtain accumulated amplitude information.

9. The method of claim 7, wherein accumulating the amplitudes of the plurality of echo signals in the beam width of the microwave radar sensor to obtain the accumulated echo signal includes:
   sampling the echo signals within the beam width of the microwave radar sensor according to a preset sampling frequency to obtain sampled signals each corresponding to one of the echo signals;
   performing Fourier transform on the sampled signals to obtain frequency domain signals each corresponding to one of the echo signals; and
   accumulating the frequency domain signals to obtain the accumulated echo signal.

10. The method of claim 1, wherein accumulating and adding the plurality of echo signals to form the accumulated echo signal includes:
    accumulating amplitudes and phases of the plurality of echo signals in the beam width of the microwave radar sensor to obtain the accumulated echo signal.

11. A microwave radar sensor comprising:
    a rotating platform including a mounting bracket and an electric motor configured to drive the mounting bracket to rotate;

a radar antenna mounted at the mounting bracket and configured to rotate with the mounting bracket; and a processer communicatively connected to the radar antenna and configured to:

control the radar antenna to transmit a plurality of frequency modulated continuous wave (FMCW) signals during rotation of the mounting bracket;

receive a plurality of echo signals reflected by a weak target;

determine a number of the plurality of echo signals in an accumulation, the number of the plurality of echo signals being smaller than or equal to a largest accumulation number, and the largest accumulation number indicating a maximum number of echo signals that are able to be accumulated based on a parameter associated with the microwave radar sensor;

accumulate and add the plurality of echo signals, each including a frequency within a beam width of the microwave radar sensor, based on the number of the plurality of echo signals to form an accumulated echo signal; and determine position information of the weak target according to the accumulated echo signal and detection thresholds within the beam width of the microwave radar sensor.

12. The microwave radar sensor of claim 11, wherein the largest accumulation number decreases as an angular velocity of the microwave radar sensor increases.

13. The microwave radar sensor of claim 11, wherein the largest accumulation number is determined according to the angular velocity of the microwave radar senor, a 3db beam width, and a period of the echo signals.

14. The microwave radar sensor of claim 13, wherein the largest accumulation number increases as the 3db beam width increases.

15. The microwave radar sensor of claim 13, the largest accumulation number decreases as the period of the echo signals increases.

16. The microwave radar sensor of claim 13, wherein the largest accumulation number is equal to a ratio of the beam width to the angular velocity of the microwave radar sensor and the period of the echo signals.

17. The microwave radar sensor of claim 11, wherein the processor is configured to:

accumulate amplitudes of the plurality of echo signals within the beam width of the microwave radar sensor to obtain the accumulated echo signal.

18. The microwave radar sensor of claim 17, wherein the processor is configured to:

perform a weighted calculation on the amplitudes of the plurality of echo signals within the beam width of the microwave radar sensor to obtain accumulated amplitude information.

19. The microwave radar sensor of claim 17, wherein the processor is configured to:

sample the echo signals within the beam width of the microwave radar sensor according to a preset sampling frequency to obtain sampled signals each corresponding to one of the echo signals;

perform a Fourier transform on the sampled signals to obtain frequency domain signals each corresponding to one of the echo signals; and accumulate the frequency domain signals to obtain the accumulated echo signal.

20. The microwave radar sensor of claim 11, wherein the processor is configured to:

accumulate amplitudes and phases of the plurality of echo signals within the beam width of the microwave radar sensor to obtain the accumulated echo signal.

* * * * *